Patented Sept. 10, 1946

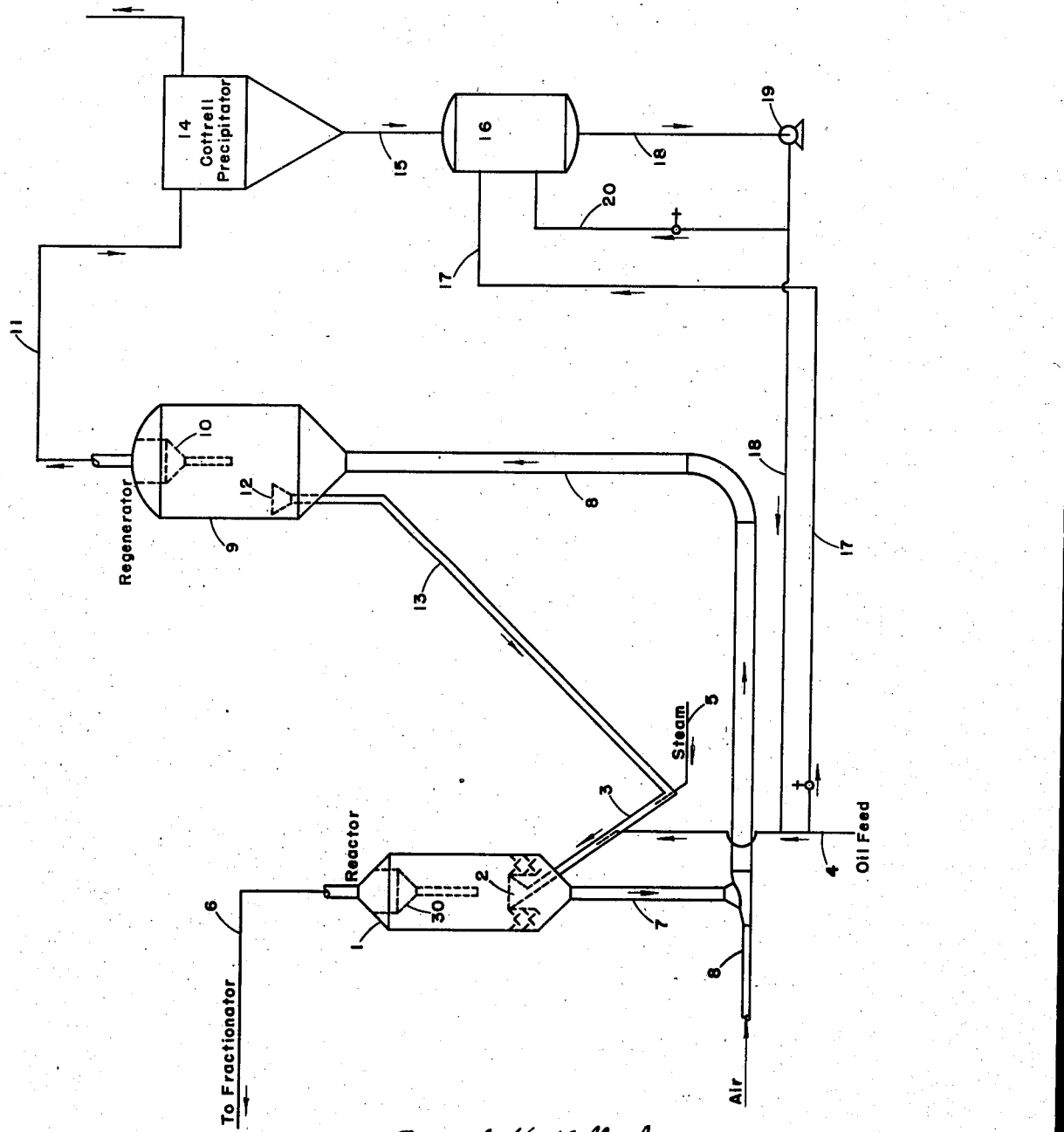

2,407,374

UNITED STATES PATENT OFFICE 2,407,374

CATALYTIC CRACKING PROCESS

Conrad H. Kollenberg, Goose Creek, Tex., assignor to Standard Oil Development Company, a corporation of Delaware Application August 1, 1944, Serial No. 547,553

1 Claim. (Cl. 196—52)

The present invention is directed to catalytic cracking of the fluid flow type and particularly to the downflow modification thereof.

In the downflow type of fluid flow catalytic cracking, there is provided a reactor and a regenerator. Finely divided catalyst, in suspension in vapors of the hydrocarbons to be cracked, is fed into the bottom of the reactor. The velocity of flow of the hydrocarbons is regulated so that the hydrocarbon vapors carry the catalyst to an intermediate point in the reactor at which point there is a concentration of catalyst resulting in the forming of a dense zone from the outer annulus of which the catalyst particles drop to the bottom of the reactor from which they are withdrawn. Upon leaving the reactor the catalyst particles are picked up by a stream of hot air which carries them to the regenerator where the carbonaceous materials deposited on the catalyst in the reactor are burned off. The catalyst flow in the regenerator follows the same pattern as in the reactor with regenerated catalyst falling into a well in the lower section of the regenerator from which point it is fed back to the reactor.

The combustion gases leaving the regenerator carry with them a considerable amount of finely divided catalyst. These gases are passed through a Cottrell precipitator in which the catalyst particles are deposited.

According to the present invention, the finely divided catalyst in the Cottrell precipitator is made into a slurry with a portion of the oil fed into the reactor and this slurry is injected into the oil feed line. The normal course would be to reinject this powdered catalyst into the regenerator because it is in the regenerator that the catalyst is brought to reaction temperature and it is the heat contained in the catalyst leaving the regenerator which supplies the heat of reaction in the reactor. This procedure, however, imposes limitations on the regeneration operation. The Cottrell precipitator, by virtue of its construction, is not capable of withstanding substantial pressure. If the fines in the Cottrell precipitator are returned to the regenerator, the latter cannot be operated at a pressure substantially greater than that which can be tolerated in the precipitator. This has meant in the past that the regenerator be operated at a pressure of only about 2 to 3 pounds gauge. By adoption of the feature of the present invention it not only becomes easier to handle the fines deposited in the percipitator, since it is a simple matter to pump the slurry to the desired reactor pressure, but the operating gauge pressure in the regenerator can be doubled. This permits the utilization of larger quantities of air which results in more efficient regeneration and greater regenerator capacity.

The present invention may be more clearly understood from the following detailed description of the accompanying drawing in which the single figure is a front elevation in diagrammatic form of a downflow catalytic cracking system embodying the present invention.

Referring to the drawing in detail, numeral 1 designates a reactor in the lower portion of which is a funnel 2 connected to a pipe 3 extending outside the reactor. The oil to be cracked is fed into pipe 3 through line 4. It is introduced as a liquid but is vaporized by the hot catalyst. Steam is also introduced into pipe 3 by line 5, this steam being employed primarily to aid in the distribution of the catalyst and the reactant.

The cracked oil leaves the top of reactor 1 through line 6 passing first through cyclone separator 30 to remove the bulk of suspended catalyst. The used catalyst drops to the bottom of the reactor and is withdrawn through a large pipe 7 which feeds the used catalyst to a hot air line 8, the latter discharging into the bottom of a regenerator 9. At the top of the regenerator is a cyclone separator 10 above which is an outlet 11 for combustion gases. A funnel 12 is arranged in the bottom of the regenerator to collect regenerated catalyst dropping to the bottom of the regenerator and fed into a pipe 13 connected to pipe 3.

The combustion gases in line 11 pass through a Cottrell precipitator 14 from the bottom of which fines pass out through pipe 15 into a drum 16.

Into an intermediate portion of drum 16 there is introduced by way of branch line 17 connected with oil feed line 4 a sufficient quantity of the feed oil to form a slurry with the fines. This slurry is conducted by line 18 from the bottom of tank 16 to feed line 4. A pump 19 arranged in pipe 18 serves to bring the slurry to the pressure maintained in the reactor and also to recycle some of the slurry back to tank 16 through line 20 in order to insure complete removal of the fines from the tank 16.

The nature and objects of the present invention having been thus described and illustrated, what is claimed as new and useful and is desired to be secured by Letters Patent is:

In a catalytic cracking process in which there is a cracking stage and a catalyst regeneration stage wherein the catalyst is subjected to a hot combustion supporting gas, the bulk of the regenerated catalyst is collected and returned to the cracking stage, and from whence combustion gases carrying finely divided catalyst are conducted to an electrical precipitator stage, the steps of maintaining the catalyst regeneration stage at a higher absolute pressure than the electrical precipitator stage, transferring combustion gases and a minor quantity of entrained finely divided catalyst from said regeneration stage to said precipitator stage, separating the finely divided catalyst from the combustion gases in said precipitator stage, separately removing the combustion gases and finely divided catalyst from said precipitator stage, forming a slurry of the last-mentioned finely divided catalyst with feed oil to the cracking stage, and introducing said slurry into the cracking stage.

CONRAD H. KOLLENBERG.